(12) United States Patent
Tsuchiya

(10) Patent No.: US 7,796,877 B2
(45) Date of Patent: Sep. 14, 2010

(54) FOCUS-CONTROLLING APPARATUS AND PHOTOGRAPHING APPARATUS

(75) Inventor: Hitoshi Tsuchiya, Hamura (JP)

(73) Assignee: Olympus Corporation, Tokyo (JP)

( * ) Notice: Subject to any disclaimer, the term of this patent is extended or adjusted under 35 U.S.C. 154(b) by 350 days.

(21) Appl. No.: 11/971,375

(22) Filed: Jan. 9, 2008

(65) Prior Publication Data

US 2008/0166116 A1     Jul. 10, 2008

(30) Foreign Application Priority Data

Jan. 10, 2007    (JP)  ............... 2007-002769

(51) Int. Cl.
    *G03B 3/10*     (2006.01)
    *G03B 13/00*    (2006.01)

(52) U.S. Cl. ...................... 396/123; 348/345
(58) Field of Classification Search ................ 396/103, 396/104, 121, 123, 137, 147, 102; 348/345, 348/346
See application file for complete search history.

(56) References Cited

U.S. PATENT DOCUMENTS

| | | | | |
|---|---|---|---|---|
| 5,130,735 | A | * | 7/1992 | Kusaka et al. ............. 396/104 |
| 6,463,214 | B1 | * | 10/2002 | Nakata ...................... 396/104 |
| 7,444,074 | B2 | * | 10/2008 | Shibasaki ................... 396/121 |
| 2001/0010556 | A1 | * | 8/2001 | Sugimoto et al. ........... 348/345 |
| 2007/0019940 | A1 | * | 1/2007 | Sasaki ....................... 396/121 |

FOREIGN PATENT DOCUMENTS

| | | | |
|---|---|---|---|
| JP | 1-288845 A | | 11/1989 |
| JP | 6-201984 A | | 7/1994 |
| JP | H08-286253 A | * | 1/1996 |

OTHER PUBLICATIONS

JP H08-286253 A Machined Translation available from JPO website.*

* cited by examiner

*Primary Examiner*—W. B. Perkey
*Assistant Examiner*—Minh Q Phan
(74) *Attorney, Agent, or Firm*—Westerman, Hattori, Daniels & Adrian, LLP

(57) ABSTRACT

A focus-controlling apparatus adjusts a focus in an optical system. The apparatus includes a focus detecting unit, a storage unit, a focus area switching unit, and a drive control unit. The focus detecting unit detects de-focusing amounts of the optical system with respect to a plurality of objects that lie in a plurality of focus areas, respectively. The storage unit stores the de-focusing amounts detected for the respective focus areas. The focus area switching unit switches the focus areas, from one to another, in an order based on the de-focusing amounts stored in the storage unit. The drive control unit moves the optical system to a focus position corresponding to the de-focusing amount at any focus area switched by the focus area switching unit.

12 Claims, 11 Drawing Sheets

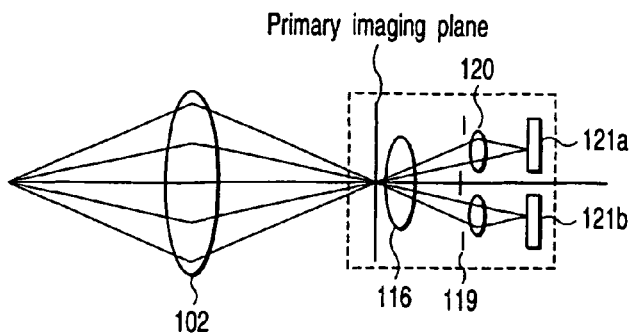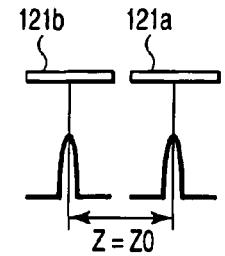
FIG. 4A  FIG. 4B
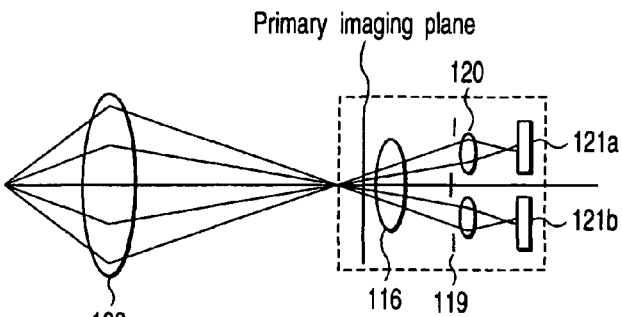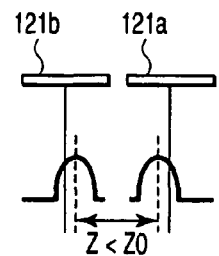
FIG. 4C  FIG. 4D
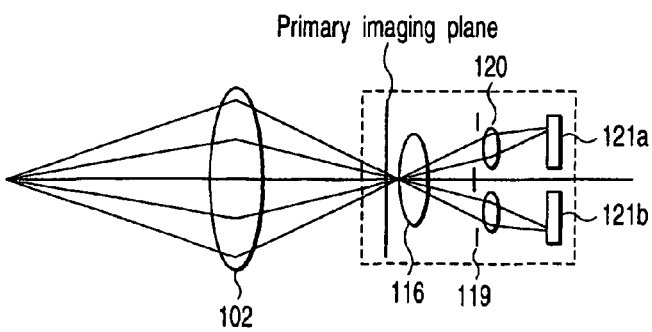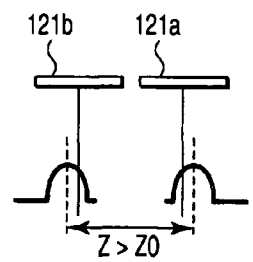
FIG. 4E  FIG. 4F

FOCUS-CONTROLLING APPARATUS AND PHOTOGRAPHING APPARATUS

CROSS-REFERENCE TO RELATED APPLICATIONS

This application is based upon and claims the benefit of priority from prior Japanese Patent Application No. 2007-002769, filed Jan. 10, 2007, the entire contents of which are incorporated herein by reference.

BACKGROUND OF THE INVENTION

1. Field of the Invention

The present invention relates to a focus-controlling apparatus that can adjust a focus with respect to a plurality of focus areas and also to a photographing apparatus that has the focus-controlling apparatus.

2. Description of the Related Art

In recent years, cameras have become more sophisticated in performance and function. More and more cameras are used, each incorporating an auto focus sensor capable of detecting the focusing states at many focus areas in the photographing viewfield.

Most cameras of this type can operate in two focusing modes. One mode is a so-called manual focusing mode, in which the user may operate a focus-adjusting mechanism after looking at the viewfinder image and confirming that the object is focused. The other mode is a so-called automatic focusing mode, in which an auto focus sensor detects the focusing state at every focus area and the camera sets the focus at a given focus area.

In the manual focusing mode, the user first observes the viewfinder image and then adjusts the focused state of the object image. In this case, the user can indeed roughly set the focus at a desired object, but he or she requires high skill to set the focus at the object accurately and correctly. Hence, unless the user is a skilled camera user or is accustomed to using the camera, the pictures he or she takes may be somewhat out of focus. That is, he or she may fail to take a good picture.

In the automatic focusing mode, a desired object can be indeed focused without fail, but a focus area different from the point at which the object desired by the user may be selected. In this case, the image of the desired object will be out of focus and the camera will fail to take a good picture.

To prevent the selection of a wrong focus area in the automatic focusing mode, various methods have been proposed, which enable the user to select a desired focus area, thereby to taking a good picture.

For example, the camera disclosed in Jpn. Pat. Appln. No. 1-288845 comprises a camera body and a view-selecting dial provided on the camera body. The user may rotate the view-setting dial to switch the focus area displayed and superposed in the viewfinder, from one to another. In other words, the focus area can be switched from one to another as the view-setting dial is rotated. Therefore, the user can recognize, by intuition, the switching of focus area points in association with the when rotating of the view-selecting dial.

The camera disclosed in Jpn. Pat. Appln. No. 6-201984 can detect the line of sight of the user who is observing the image in the view viewfinder and can select the focus area that aligns with the direction of the line of sight.

BRIEF SUMMARY OF THE INVENTION

According to a first aspect of the present invention, there is provided a focus-controlling apparatus adjusts a focus in an optical system. The apparatus includes a focus detecting unit, a storage unit, a focus area switching unit, and a drive control unit. The focus detecting unit detects de-focusing amounts of the optical system with respect to a plurality of objects that lie in a plurality of focus areas, respectively. The storage unit stores the de-focusing amounts detected for the focus areas. The focus area switching unit switches the focus areas, from one to another, in an order based on the de-focusing amounts stored in the storage unit. The drive control unit moves the optical system to a focus position corresponding to the de-focusing amount at any focus area switched by the focus area switching unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A, 4B, 4C, 4D, 4E, and 4F are diagrams explaining the principle of focus adjustment achieved by a phase-difference detection system;

DETAILED DESCRIPTION OF THE INVENTION

Embodiments of the present invention will be described, with reference to the accompanying drawings.

First Embodiment

Figure 1:
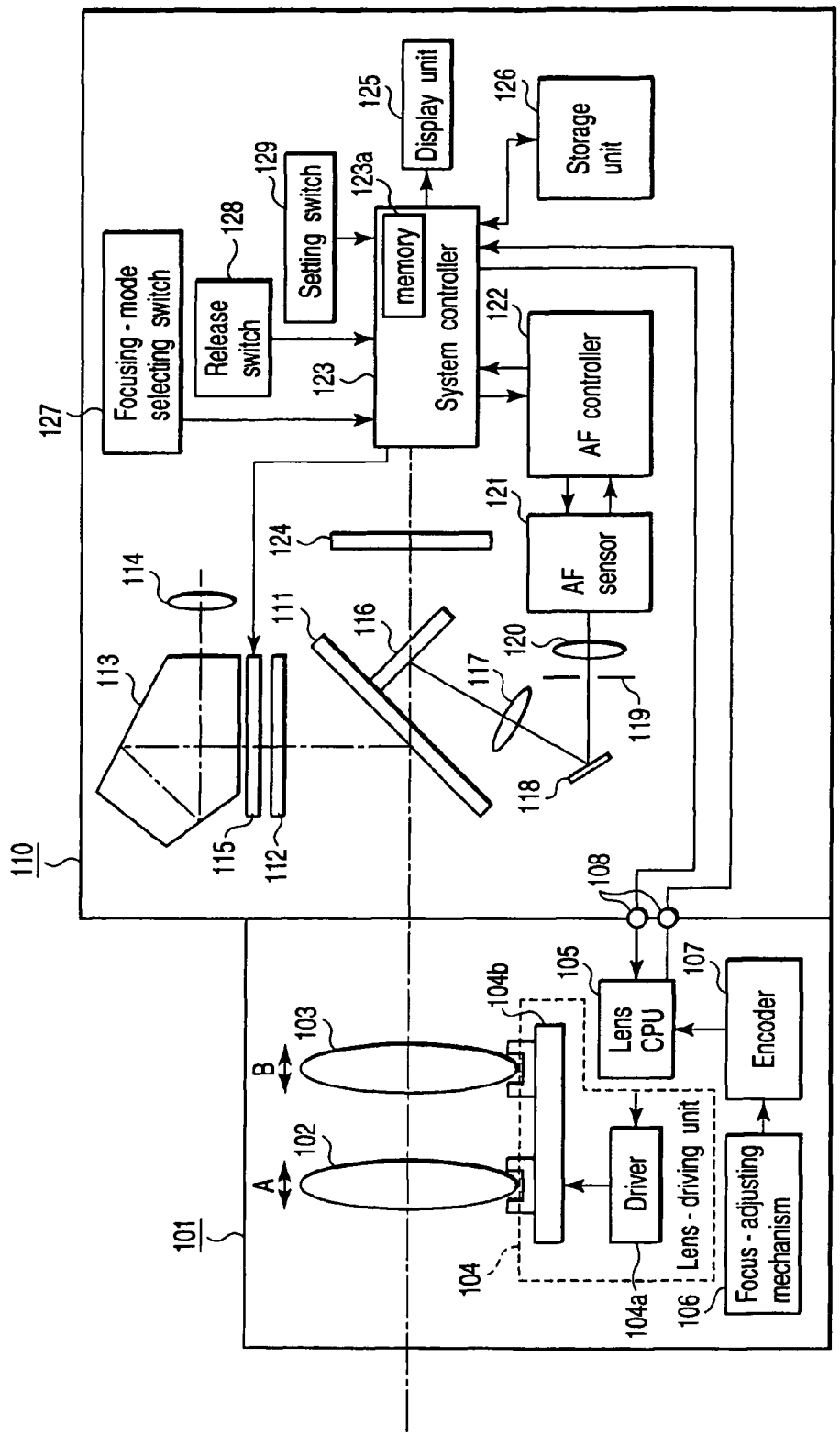
FIG. 1 is a diagram showing the configuration of a digital single-lens reflex camera that is a photographing apparatus according to a first embodiment of the present invention.

A first embodiment of the present invention will be described. FIG. 1 shows the configuration of a digital single-lens reflex camera (hereinafter referred to as a camera, whenever necessary) that is a photographing apparatus according to the first embodiment of the invention. The camera shown in FIG. 1 can be set to an automatic focusing mode, manual focusing mode and semiautomatic focusing mode. In the automatic focusing mode, all processes of adjusting the focus in the optical system are automatically performed. In the manual focusing mode, the user manually adjusts the focus in the optical system. The semiautomatic focusing mode is, so to speak, a mode halfway between the automatic focusing mode and the manual focusing mode. In the semiautomatic focusing mode, as the user adjusts the focus, the focus areas are sequentially switched, from one to another, in the ascending order of de-focusing amount, and the focusing is automatically adjusted at any focus area switched.

Before the first embodiment is described in detail, the focus-adjusting mechanism incorporated in the camera will be explained.

The camera shown in FIG. 1 comprises a lens unit 101 and a camera body 110. The lens unit 101 is detachably attached to the lens mount (not shown) that is provided on the front of the camera body 110. The lens unit 101 comprises a photographing optical system, a lens-driving unit 104, a lens CPU 105, a focus-adjusting mechanism 106, and an encoder 107. The photographing optical system includes a focusing lens 102, a zooming lens 103 and the like.

The focusing lens 102 is a lens provided in the photographing optical system, and is used to adjust the focus. The lens-driving unit 104 can drive the focusing lens 102 along the optical axis thereof (in the direction of arrow A shown in FIG. 1). When the focusing lens 102 is so driven, it adjusts the position of the focus in the photographing optical system. The luminous flux coming from the photography object (not shown) through the photographing optical system forms a well-focused image on the image sensor 124 provided in the camera body 110. The zooming lens 103 is a lens included in the photographing optical system, and is designed to perform zooming. The lens-driving unit 104 drives the zooming lens 103 along the optical axis thereof (in the direction of arrow B shown in FIG. 1), adjusting the focal distance in the photographing optical system. The image formed by the luminous flux coming from a photography object (not shown) through the photographing optical system is thereby magnified or reduced.

The lens-driving unit 104 is an ultrasonic actuator composed of, for example, a driver 104a and a piezoelectric element 104b. In the lens-driving unit 104, a signal generated by the driver 104a vibrates the piezoelectric element 104b. Thus vibrated, the piezoelectric element 104b drives the focusing lens 102 or the zooming lens 103, by virtue of the friction between it and the focusing lens 102 or the zooming lens 103.

The lens-driving unit 104 need not be an ultrasonic actuator. However, it is preferably an ultrasonic actuator, because no gears are used to transmit the drive force. Therefore, no backlash occurs even if the direction in which the focusing lens 102 or the zooming lens 103 is driven is changed. This prevents a decrease in the focusing accuracy.

The lens CPU 105 is a control circuit for controlling the lens-driving unit 104. A communications connector 108 connects the lens CPU 105 to a system controller 123 that is provided in the camera body 110. Various lens data is therefore supplied from the lens CPU 105 to the system controller 123. The lens data items include data items to be used in calculating a de-focusing amount, such as an item representing the characteristic deviation the focusing lens 102 has with respect to the design characteristics and an item representing the aberration of the focusing lens.

The focus-adjusting mechanism 106, which is an example of a focus area switching unit or a manual setting unit, is an operation mechanism the user operates in the manual focusing mode or the semiautomatic focusing mode. The focus-adjusting mechanism 106 can set the direction and distance in and for which the focusing lens 102 should be driven, toward the near side (to the right in FIG. 1, to shorten the focal distance of the focusing lens 102), or toward the infinity side (to the left in FIG. 1, to lengthen the focal distance of the focusing lens 102). The encoder 107 detects the direction and distance which the focus-adjusting mechanism 106 has set and in and for which the focusing lens 102 should be driven. The encoder 107 generates a signal that represents the direction and distance it has detected. The detection signal is supplied to the lens CPU 105. In accordance with the signal, the lens CPU 105 controls the lens-driving unit 104 so that the focusing lens 102 may be driven in the direction and for the distance.

The camera body 110 contains a main mirror 111, a viewfinder optical system, a sub-mirror 116, an AF optical system, an AF sensor 121, an AF controller 122, a system controller 123, an image sensor 124, a display unit 125, a storage unit 126, a focusing-mode selecting switch 127, a release switch 128, and a setting switch 129. The viewfinder optical system includes a focusing screen 112, a pentagonal prism 113, an ocular lens 114, and an image-superposing unit 115. The AF optical system includes a condenser lens 117, a total-reflecting mirror 118, a separator diaphragm 119, and a separator lens 120.

The main mirror 111 is a mirror that can be rotated. Its center part is a half mirror. While remaining in the down position (shown in FIG. 1), the main mirror 111 reflects a part of the luminous flux coming from a photography object (not shown) into the camera body 110 through the lens unit 101 and allows the passage of the remaining part of the luminous flux. The luminous flux reflected by the main mirror 111 forms an object image on the focusing screen 112. The pentagonal prism 113 applies the object image, as an erected image, to the ocular lens 114. The ocular lens 114 magnifies the object image coming from the pentagonal prism 113, which allows the user to see the image. The user can therefore observe the object in a focused state.

The image-superposing unit 115 superposes focus areas (i.e., images of focus areas) and images representing the focused states at the focus areas, on the object image that is projected to the focusing screen 112.

The sub-mirror 116 is laid on the back of the half-mirror part of the main mirror 111. The sub-mirror 116 reflects the luminous flux coming through the half-mirror part of the main mirror 111, toward the AF optical system.

In the AF optical system, the condenser lens 117 receives the luminous flux reflected by the sub-mirror 116, condenses the flux applied to a primary imaging plane (not shown) and applies the luminous flux, thus condensed, to the total-reflecting mirror 118. The total-reflecting mirror 118 receives this luminous flux and reflects the same toward the AF sensor 121. The separator diaphragm 119 is arranged in front of the AF sensor 121. The diaphragm 119 receives the luminous flux from the total-reflecting mirror 118 and splits the same into light beams. The separator lens 120 condenses these light beams on the AF sensor 121.

The AF sensor 121 converts the object image, which has been formed by focusing the light beams and which therefore has aberration, into an electric signal. The AF sensor 121 is configured to detect the focused states at a plurality of focus-detecting areas in the photographed image.

The AF controller 122 reads a pair of electric signals from the AF sensor 121 and performs, for example, correlation on these electric signals, thereby finding the distance between the two images of the photography object (inter-image pitch). The system controller 123 calculates a de-focusing amount from the inter-image pitch that has been found by the AF controller 122. Further, the system controller 123 controls the image-superposing unit 115 on the basis of the de-focusing amount thus calculated. The system controller 123 selects one of the de-focusing amounts calculated for the respective focus areas, which is to be used to adjust the focus. The de-focusing amount selected is supplied to the lens CPU 105. On the basis of the selected de-focusing amount, the lens CPU 105 adjusts the focus of the focusing lens 102. A drive control unit is thus constituted.

The system controller 123 controls some of the other components of the camera shown in FIG. 1. The system controller 123 has a memory 123a that is a storage unit for storing the de-focusing amount calculated from the distance between the two images, which the AF controller 122 has found.

The image sensor 124 receives the object image from the photographing optical system when the main mirror 111 is moved away from the position shown in FIG. 1. The image sensor 124 converts this object image into an electric signal. The system controller 123 performs various processes on the electric signal and causes the display unit 125 to display the image represented by the electric signal. Alternatively, the system controller 123 stores the electric signal in the storage unit 126.

The focusing-mode selecting switch 127 is an example of a mode-switching unit. The switch 127 performs its function when the user operates the focusing-mode selecting member provided on the camera body 110. The focusing-mode selecting switch 127 can supply a manual-focusing mode signal, an automatic-focusing mode signal or a semiautomatic-focusing mode signal to the system controller 123. The release switch 128 is changed over when the user pushes the release button provided on the camera body 110. When the user pushes the release button, the release switch 128 supplies an AF-start signal or a photographing-start signal to the system controller 123. The release switch 128 is composed of a first release switch and a second release switch. When the release switch 128 is depressed to halfway down, the first release switch is turned on, supplying the AF-start signal to the system controller 123. When the release button is depressed fully down, the second release switch is turned on, supplying the photographing-start signal to the system controller 123. The setting switch 129 is changed over when the user pushes the setting buttons provided on the camera body 110. When the user pushes any one of the setting buttons, the setting switch 129 supplies a setting signal to the system controller 123.

Figure 2:
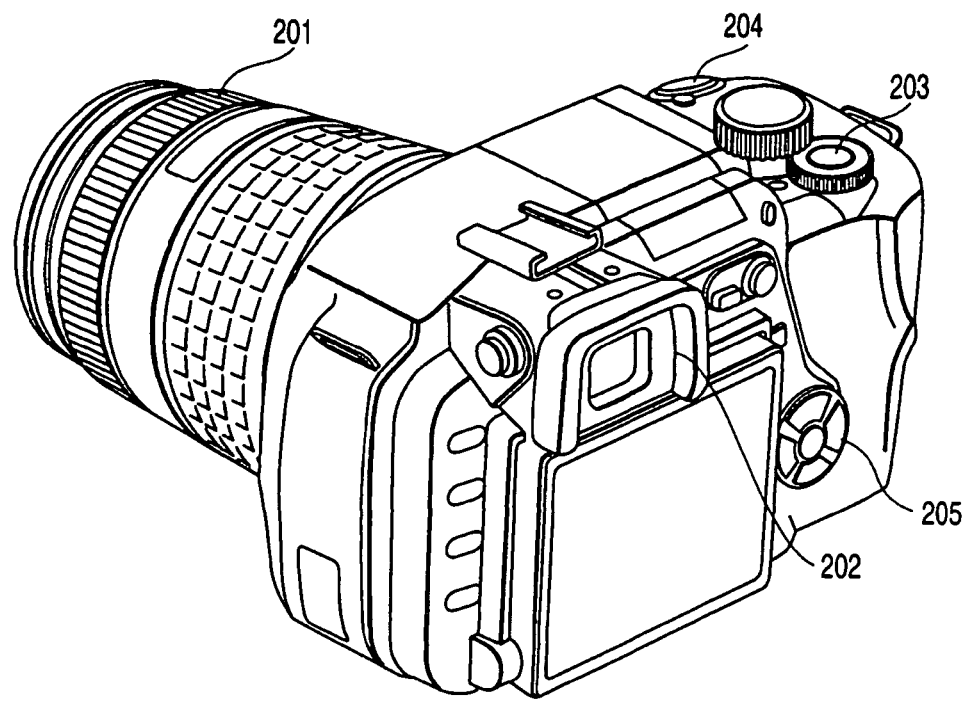
FIG. 2 is a perspective view of the single-lens reflex camera shown in FIG. 1.

FIG. 2 is a perspective view of the camera shown in FIG. 1. As FIG. 2 shows, the lens unit 101 has a focusing ring 201, which is a component of the focus-adjusting mechanism 106. The user can rotate the focusing ring 201. The direction and distance in and for which the user has rotated the focusing ring 201 are detected by the encoder 107. A viewfinder 202 is mounted on the camera body 110. The viewfinder 202 contains the ocular lens 114 (shown in FIG. 1). Hence, the user can observe the object image by looking into the viewfinder 202. The focusing-mode selecting member 203, release button 204 and setting buttons 205 are provided on the camera body 110, too. They may be manipulated to operate the associated switches shown in FIG. 1, respectively.

How the camera shown in FIG. 1 operates will be explained below.

First, it will be explained how the camera operates when the focusing-mode selecting switch 127 is switched, setting the camera to the automatic focusing mode. The automatic focusing mode is classified into a single-shot automatic focusing mode, a continuous automatic focusing mode, and the like. In the single-shot automatic focusing mode, one of the focus areas in the image is selected in accordance with a prescribed algorithm. In the continuous automatic focusing mode, which is suitable for photographing a moving object, the focus is adjusted every time a designated object is tracked. It is assumed here that the focus is adjusted in the single-shot automatic focusing mode.

The user may depress the release button 204 halfway down, thus turning on the first release switch. In this case, the system controller 123 controls the AF controller 122, causing the same to find the inter-image pitch for each focus area. From the inter-image pitch, the system controller 123 calculates a de-focusing amount.

Figure 3:
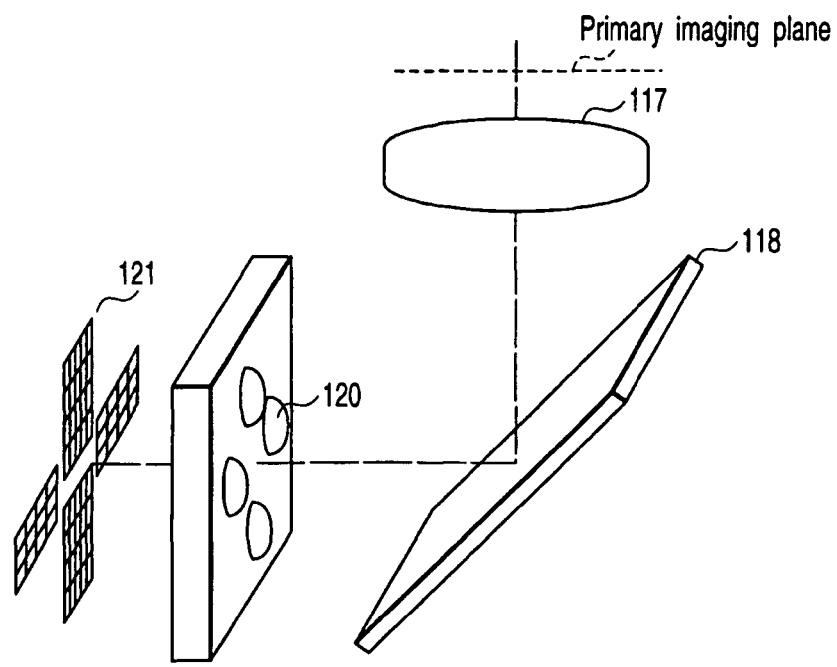
FIG. 3 is a schematic representation of the secondary focusing system provided in the AF optical system of the single-lens reflex camera.

How the de-focusing amount is calculated will be briefly explained. FIG. 3 schematically shows the secondary focusing unit provided in the AF optical system incorporated in the camera shown in FIG. 1. As described above, the luminous flux reflected by the sub-mirror 116 forms an object image on the primary imaging plane lying at a distance optically equal to the distance at which the image sensor 124 is arranged. The luminous flux forming the object image on the primary imaging plane is condensed by the condenser lens 117 and reflected by the total-reflecting mirror 118. Then, the luminous flux is split into light beams by the separator diaphragm 119. The separator lens 120 condenses these light beams on a prescribed region of the AF sensor 121 that is provided at the back of the AF optical system (i.e., light-receiving surface, in FIG. 3). The AF sensor 121 has a plurality of line-sensor pairs, each being associated with one focus area. The AF sensor 121 has line-sensor pairs for detecting the object image at one focus area. FIG. 3 shows the case where the first pair consists of two line sensors arranged in a horizontal line, and the second pair consists of two line sensors arranged in a vertical line.

FIGS. 4A to 4F are diagrams explaining the principle of focus adjustment achieved by a phase-difference detection system, in connection with only one of the line-sensor pairs. Nonetheless, the principle of focus adjustment holds true for the other line-sensor pair.

In the phase-difference system, two object images formed on the sensor arrays 121a and 121b, respectively, which are provided in the AF sensor 121 and which are shown in FIGS. 4B, 4D and 4F, are correlated by a known method, finding the distance between these object images. The distance between the object images is almost proportional to the de-focusing amount. Hence, the de-focusing amount can be calculated from the inter-image pitch. The distance by which the focusing lens 102 should be driven to adjust the focus can be obtained from the de-focusing amount. FIGS. 4A and 4B show a state (hereinafter referred to as a focused state) in which the distance Z between the object images formed on the sensor arrays 121a and 121b, respectively, is equal to the inter-image pitch Z0 acquired when the images are well-focused. FIGS. 4C and 4D show a state (hereinafter called fore-focused state) in which the focal point lies before the photography object and the distance Z between the object images formed on the sensor arrays 121a and 121b, respectively, is shorter than the inter-image pitch Z0 acquired when the images are well-focused. FIGS. 4E and 4F show a state (hereinafter called aft-focused state) in which the focal point lies beyond the photography object and the distance Z between the object images formed on the sensor arrays 121*a* and 121*b*, respectively, is longer than the inter-image pitch Z0 acquired when the images are well-focused.

Figure 5:
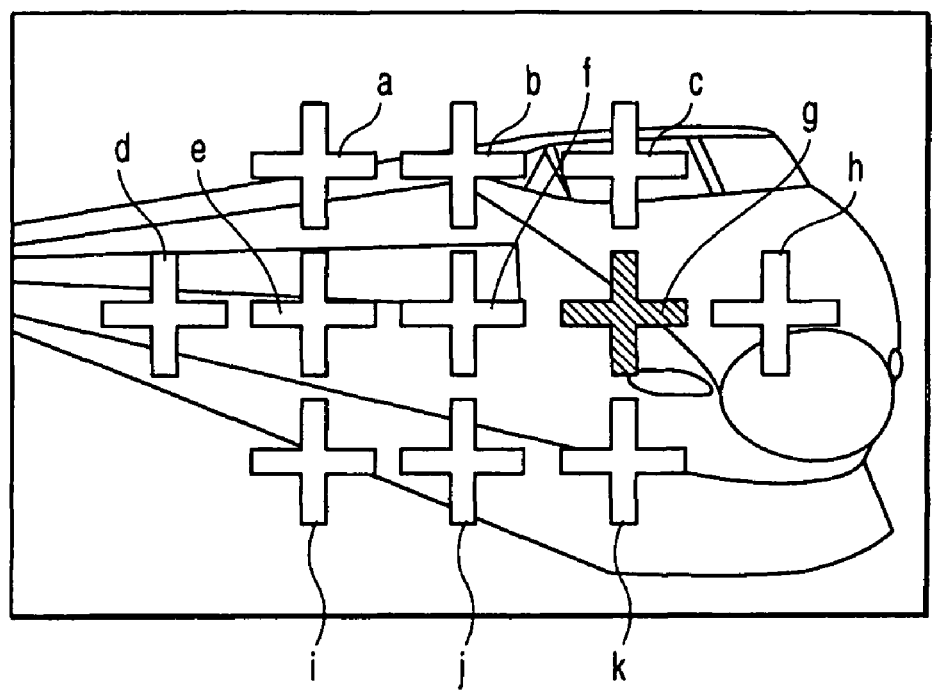
FIG. 5 is a diagram illustrating an arrangement of focus areas, at which focusing states can be detected.

FIG. 5 is a diagram illustrating an arrangement of focus areas, at which focusing states can be detected. Such an arrangement of focus areas, as shown in FIG. 5, is determined by the arrangement of the line sensors that constitute the AF sensor 121. In the case shown in FIG. 5, for example, a pair of line sensors arranged in a horizontal line and another pair of line sensors arranged in a vertical line are used to detect a focusing state at each of 11 focus areas. That is, two de-focusing amounts are calculated for each focus area. Hence, at most 22 de-focusing amounts are calculated in one focus adjustment process, by the line sensors arranged in horizontal and vertical lines. Note that the AF sensor 121, which detects the focusing states at the focus areas shown in FIG. 5, is constituted by, for example, five pairs of line sensors arranged in vertical lines and three pairs of line sensors arranged in horizontal lines.

After calculating de-focusing amounts for the focus areas, respectively, as shown in FIG. 5, the system controller 123 selects one of these de-focusing amounts by using a known algorithm for weighting each focus area and selecting the nearest focus area. The system controller 123 then generates a signal representing the de-focusing amount selected. The signal is supplied to the lens CPU 105. The lens CPU 105 controls the lens-driving unit 104 in accordance with the de-focusing amount. The lens-driving unit 104 accordingly drives the focusing lens 102. The focus is thereby adjusted with respect to the object at a given focus area in the viewfinder.

It will be explained how the camera operates when the focusing-mode selecting switch 127 is switched, setting the camera to the semiautomatic focusing mode.

In this case, when the user rotates the focusing ring 201, the encoder 107 detects the direction and rotated amount in and for which the ring 201 is rotated. The encoder 107 generates a signal representing the direction and rotated amount and supplies the signal to the lens CPU 105. The lens CPU 105 calculates the direction and rotated amount from the signal and controls the lens-driving unit 104 in accordance with the direction and rotated amount. The focusing lens 102 is thereby driven. Thus, the focusing lens 102 is driven as the user rotates the focusing ring 201.

Figure 6:
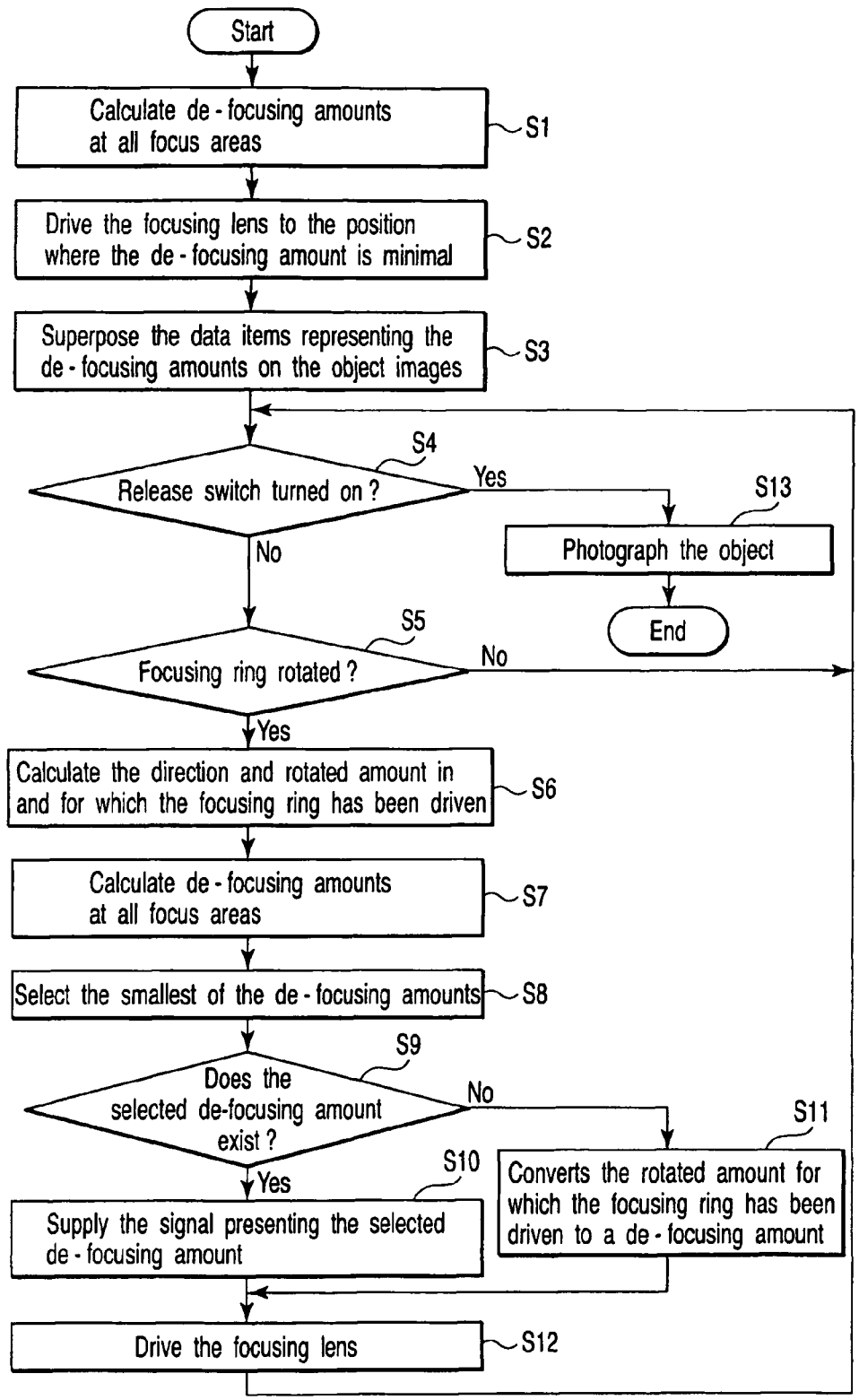
FIG. 6 is a flowchart explaining how the system controller operates while the camera according to the first embodiment remains in the semiautomatic focusing mode.
Figure 7:
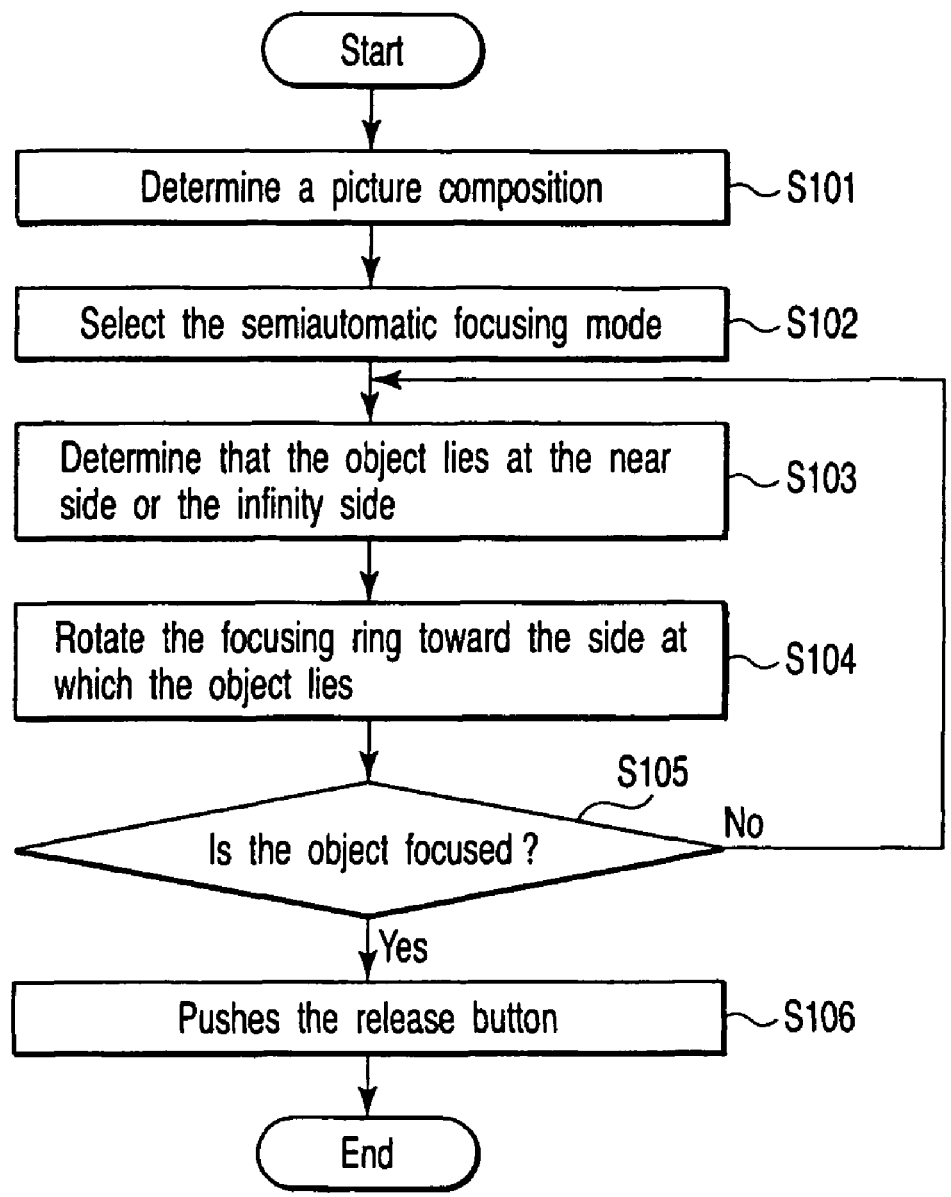
FIG. 7 is a flowchart showing the sequence of operation steps the user performs while the camera according to the first embodiment remains in the semiautomatic focusing mode.

It will be explained how the camera operates when the focusing-mode selecting switch 127 is switched, setting the camera to the semiautomatic focusing mode. FIG. 6 is a flowchart explaining how the system controller 123 performs its function in the semiautomatic focusing mode. FIG. 7 is a flowchart showing the sequence of steps the user performs to take pictures in the semiautomatic focusing mode.

First, how the system controller 123 operates will be explained, with reference to FIG. 6. When the user selects the semiautomatic focusing mode, the system controller 123 controls the AF controller 122, causing the AF controller 122 to find the distance between two images for each focus area. From the inter-image pitch, the system controller 123 calculates a de-focusing amount at each focus area. The de-focusing amount thus calculated is stored in the memory 123*a* (Step S1). The system controller 123 then selects the smallest of the de-focusing amounts calculated and generates a signal representing the smallest de-focusing amount. This signal controls the lens CPU 105. The lens CPU 105 controls the lens-driving unit 104 in accordance with the de-focusing amount. Thus controlled, the lens-driving unit 104 drives the focusing lens 102 (Step S2).

Step S2 is a process of defining the initial position the lens takes in the semiautomatic focusing mode. This process is not absolutely necessary. For example, the position the lens assumes when the semiautomatic focusing mode is selected may be used as the initial position for the lens. Alternatively, the nearest position the lens can take may be used as the initial position for the lens.

After setting the lens at the initial position, the system controller 123 makes the image-superposing unit 115 superpose the data items representing the de-focusing amounts at the respective focus areas (focus areas), on the object images projected to the focusing screen 112, by using the de-focusing amounts for the focus areas, which are stored in the memory 123*a* (Step S3). Thereafter, the system controller 123 determines whether the user has pushes the release button 204, turning on the release switch (i.e., second release switch) (Step S4). In Step S4, the release switch may not be found to have been turned on. In this case, the system controller 123 determines whether the user has rotated the focusing ring 201 (Step S5). The system controller 123 does nothing until it determines that the user has rotated the focusing ring 201. In Step S4, the release switch may be found to have been turned on. In this case, the system controller 123 causes the image sensor 124 to start photographing the object. The electric signal representing the image obtained by the photographing is stored in the storage unit 126 (Step S13).

Figure 8A:
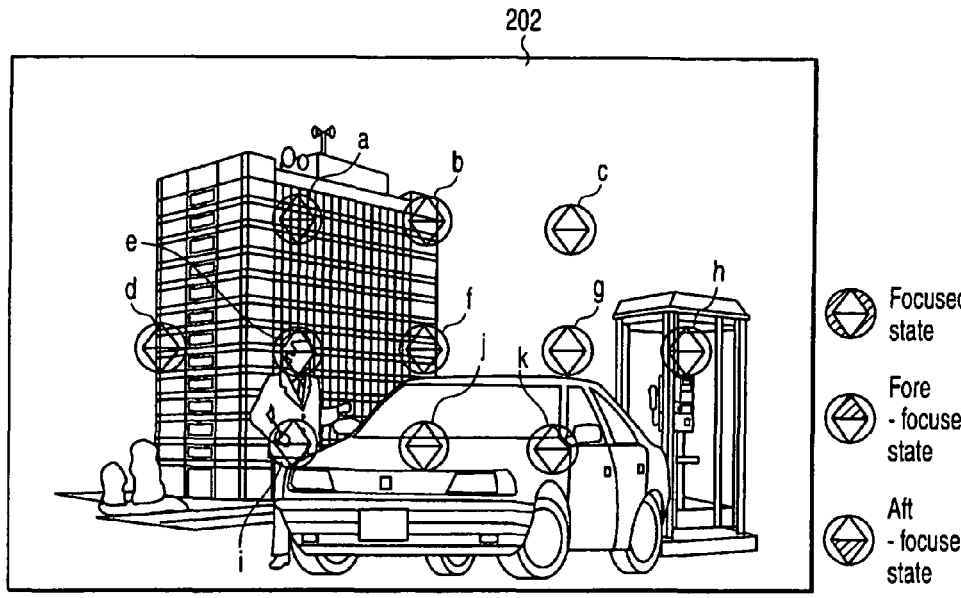
FIGS. 8A and 8B are diagrams, each showing some object images displayed and superposed in the viewfinder of the camera according to the first embodiment.
Figure 8B:
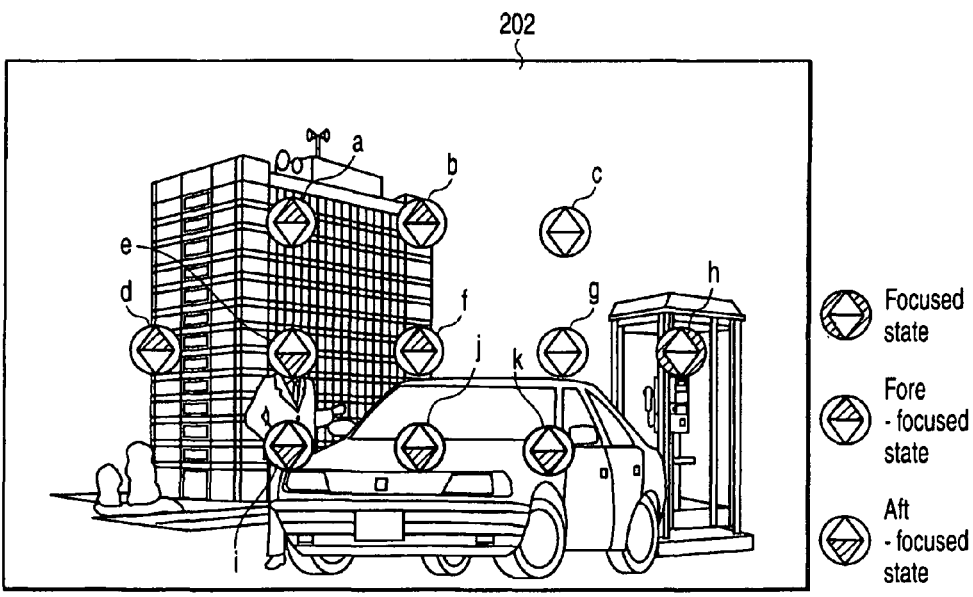

FIGS. 8A and 8B are diagrams, each showing an image which is displayed in the viewfinder 202 of the camera and in which the images of some objects are superposed, one on another. FIG. 8A shows an image in which no superposition display is made. FIG. 8B shows an image in which superposition signs are displayed. In the image shown in FIG. 8B, the image in focus is set at focus area h (that is, at the telephone booth).

The superposition display in this embodiment is always achieved while the camera remains in the semiautomatic focusing mode. A sign is displayed at a focus area for which the focus has been adjusted in Step S2, indicating that the image is well-focused at this focus area. Further, signs are displayed at the other focus areas, indicating that the image is in a fore-focused state or aft-focused state at these focus areas.

In the image of FIG. 8B, for example, the objects at focus areas e, i, j and k lie before the object at the focus area h and are therefore in aft-focused state as is shown in FIGS. 4E and 4F. The signs indicating that these objects are aft-focused have their lower half illuminated. On the other hand, the objects at focus areas a, b, d and f lie beyond the object at the focus area h are in fore-focused state as shown in FIGS. 4C and 4D. The signs indicating that these objects are aft-focused have their upper half illuminated. The objects at focus areas c and g have so low a contrast that de-focusing amounts cannot be detected for them. Hence, no signs are displayed for the objects at focus areas c and g.

When the focusing ring 201 is rotated, the encoder 107 detects the direction and rotated amount in and for which the focusing ring 201 is rotated. The encoder 107 generates a signal that represents the direction and the rotated amount. The signal is supplied to the lens CPU 105. The lens CPU 105 monitors the signal supplied from the encoder 107, at regular time intervals. The lens CPU 105 determines the rotated amount for which the ring is rotated per unit time, from the difference between the rotated amount represented by a signal and the rotated amount represented by the next signal. The lens CPU 105 determines the direction in which the ring is rotated from the sign (+ or −) of the difference between the rotated amounts represented by the two consecutive signals. After determining the direction and rotated amount in and for which the ring 201 has been rotated, the lens CPU 105 supplies a signal representing the direction and rotated amount, to the system controller 123, if the distance determined exceeds a preset threshold amount (a parameter set in the lens CPU 105). Upon receipt of this signal, the system controller 123 detects that the focusing ring 201 has been rotated and calculates, from the signal, the direction and distance in and for which the focusing lens 102 has been driven (Step S6).

Next, the system controller 123 controls the AF controller 122, causing the same to find the distance between two images for each focus area. From the inter-image pitch, the system controller 123 calculates de-focusing amounts at all focus areas. The de-focusing amounts thus calculated are stored in the memory 123*a* (Step S7).

The system controller 123 then selects the smallest of the de-focusing amounts related to the same direction as the direction in which the focusing lens 102 has been driven, from the de-focusing amounts stored in the memory 123*a* (Step S8).

Figure 9:
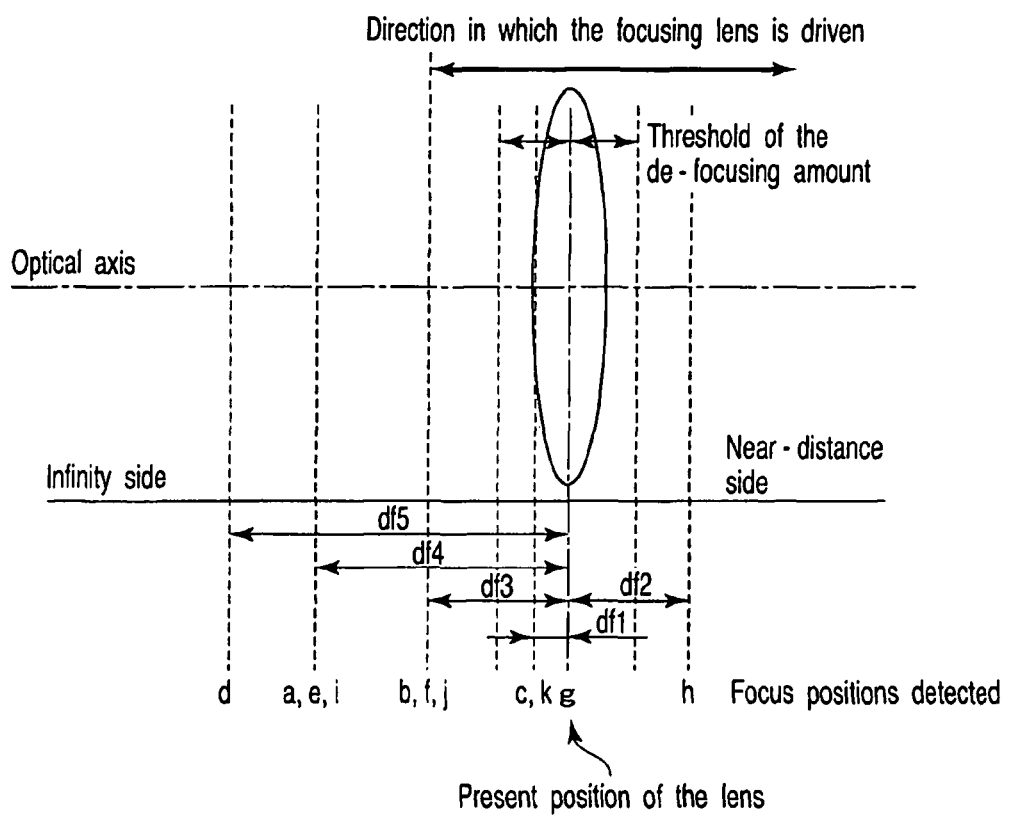
FIG. 9 is a graph representing the relation between the position of the focusing lens and the de-focusing amount, with respect to the focus areas shown in FIG. 5.

FIG. 9 is a graph representing the relation between the position of the focusing lens 102 and the de-focusing amount, with respect to the focus areas shown in FIG. 5.

Assume that the focus of the focusing lens 102 lies at focus area g as shown in FIG. 9. In other words, the focusing lens 102 has its focal point at the focus area g. Thus, the focus area g is the initial position of the focus of the focusing lens 102.

A de-focusing amount is the distance by which a focal point corresponding to a focus area deviates from the focal point of the focusing lens 102. Hence, the de-focusing amount is the distance between a focal point corresponding to this focus area and a focal point corresponding to the focus area g. In FIG. 9, the de-focusing amounts of the focus areas other than point g are indicated as df1 to df5.

The threshold for the de-focusing amounts shown in FIG. 9 has been set to tolerate minute motions of the lens. In other words, any de-focusing amount smaller than the threshold is not detected, because it is so small that the lens need not be driven to attain a focused state. Hence, if the de-focusing amount is smaller than the threshold, the focusing lens 102 will not be driven at all.

An optimal threshold for the de-focusing amounts is determined from the magnification of the zooming lens 103, the rotated amount which is designated by the lens CPU 105 and for which the focusing ring 201 should be driven per unit time, the amount set by the user, or the like. For example, if the magnification of the zooming lens 103 is small (as in wide-angle photographing, e.g., macro photographing), the threshold is reduced and the focusing lens 102 is minutely driven, thereby increasing the focusing accuracy. If the magnification of the zooming lens 103 is large (as in telephotographing), the threshold is increased, thereby changing the focusing accuracy to a relatively low value. In this case, the time for adjusting the focus can be shortened.

If the focusing ring 201 is rotated by a long rotated amount per unit time (that is, the ring 201 may be rotated fast), the threshold is increased. If the focusing ring 201 is rotated by a short distance per unit time (that is, the ring 201 may be rotated slowly), the threshold is decreased. Most users rotate the focusing ring 201 quickly in order to move the focusing lens 102 for a long distance, and rotate the focusing ring 201 slowly in order to move the focusing lens 102 for a short distance. In view of this, the threshold amount is increased if the focusing ring 201 is rotated quickly. As result, the focusing accuracy is low. The threshold amount is decreased if the focusing ring 201 is rotated slowly. As result, the focusing accuracy is high. If this is the case, the focusing control can be accomplished as the user.

The user may set the threshold for the de-focusing amounts. If this is the case, the focusing control can be accomplished as the user desires, in accordance with the threshold set by the user, not in accordance with any other conditions. Note that the user can set the threshold by merely operating the setting buttons 205 in accordance with the instructions shown in the menu screen that the display unit 125 displays.

In Step S8, the de-focusing amount df2 related to focus area h (FIG. 9) is selected because it is the smallest amount of the amounts which exceed the threshold, while the focusing lens 102 is being driven toward the near side. If the focusing lens 102 is being driven toward the infinity side, the de-focusing amount df1 related to focus areas c, k and g (FIG. 9) is the smallest. The de-focusing amount df1 is not selected in Step S8, nevertheless, because it is smaller than the threshold.

After selecting a de-focusing amount in Step S8, the system controller 123 determines whether the de-focusing amount selected exists or not (Step S9). If the selected de-focusing amount is found to exist in Step S9, the system controller 123 supplies a signal presenting the selected de-focusing amount, to the lens CPU 105 (Step S10). If the selected de-focusing amount is found not to exist in Step S9, the system controller 123 supplies a signal to the lens CPU 105, informing that no de-focusing amounts have been detected. Upon receiving this signal, the lens CPU 105 calculates a defocusing-amount from the rotated amount for which the focusing lens 102 has been driven and which has been detected by the encoder 107 (Step S11). Then, the lens CPU 105 controls the lens-driving unit 104 in accordance with the de-focusing amount acquired in Step S10 or Step S11, causing the lens-driving unit 104 to drive the focusing lens 102 (Step S12). Thereafter, the operation returns to Step S4. The sequence of steps, described above, is repeated.

The sequence of steps the user performs will be explained in detail, with reference to FIG. 7. First, the user holds the camera and directs it to a photography object, thus determining a picture composition. At this time, the viewfinder 202 displays the image shown in FIG. 8A (Step S101).

After determining the picture composition, the user operates the focusing-mode selecting member 203, switching the operating mode of the camera to the semiautomatic focusing mode (Step S102). The user may change the operating mode to the semiautomatic focusing mode before he or she determines the picture composition. At the time the camera is set to the semiautomatic focusing mode, calculation is started to obtain a de-focusing amount. As a result, such an image as shown in FIG. 8B is displayed in the viewfinder 202. Looking into the viewfinder 202, the user confirms the positional relation between the object now focused well (i.e., the telephone booth, in FIG. 8B) and the object that should be focused well (Step S103).

The user rotates the focusing ring 201, moving the same toward the near side in order to set the focus at any object lying before the object now focused well, or toward the infinity side in order to set the focus at any object lying beyond the object now focused well (Step S104). As the focusing ring 201 is so rotated, the focusing lens 102 is driven. Then, the user determines whether the object has been focused as he or she desires (Step S105). If the object is not focused as desired, the user keeps rotating the focusing ring 201. If the object is focused as desired, the user pushes the release button 204, whereby photographing is performed (Step S106).

Assume that the user wants to bring the person or car (shown in FIG. 8B) to focus. Then, he or she rotates the focusing ring 201 toward the near side. As the focusing ring 201 is rotated toward the near side, the focus areas corresponding to focus areas e and i are selected. As the focusing ring 201 is rotated toward the near side, the focus areas corresponding to focus areas j and k are selected. Thus, the person and the car are sequentially focused. To bring the building into focus, the user rotates the focusing ring 201 toward the infinity side. As the focusing ring 201 is rotated toward the infinity side, the measuring fields corresponding to focus areas a, b, d and f are selected, whereby the building is focused. If the focusing ring 201 is further rotated toward the infinity side, no corresponding de-focusing amounts will be detected. In this case, the focusing lens 102 is projected toward the infinity side as it is rotated.

As has been described, with the first embodiment the user can switch one object to another, each to be focused, by rotating the focusing lens 201 while observing the de-focusing amounts displayed in the viewfinder 202. The user can know, by intuition, what, he or she is doing with the camera. Further, the user need not perform minute focus adjustment because the lens is driven in accordance with the data detected by the AF sensor 121. Any object the user wants to bring to focus can therefore be focused reliably and easily. With this camera, the user never fails to take good pictures.

When the user rotates the focusing ring 201 to switch one object to another to be focused, the de-focusing amount is smaller than the threshold and the focusing lens 102 needs to be driven very little. In this case, the lens is not driven at all. A small motion of the focusing lens 102 is therefore suppressed within the depth of the object field. This makes the user feel nothing wrong in using the camera.

Second Embodiment

A second embodiment of the present invention will be described. In the first embodiment, the focusing lens 102 is driven every time the user rotates the focusing ring 201. In the second embodiment, the focusing lens 102 is driven only once before photographing is performed. Note that the second embodiment is identical to the first embodiment in the configuration of the camera and the calculation of de-focusing amounts. Therefore, the configuration of the camera and the calculation of de-focusing amounts will not be explained.

Figure 10:
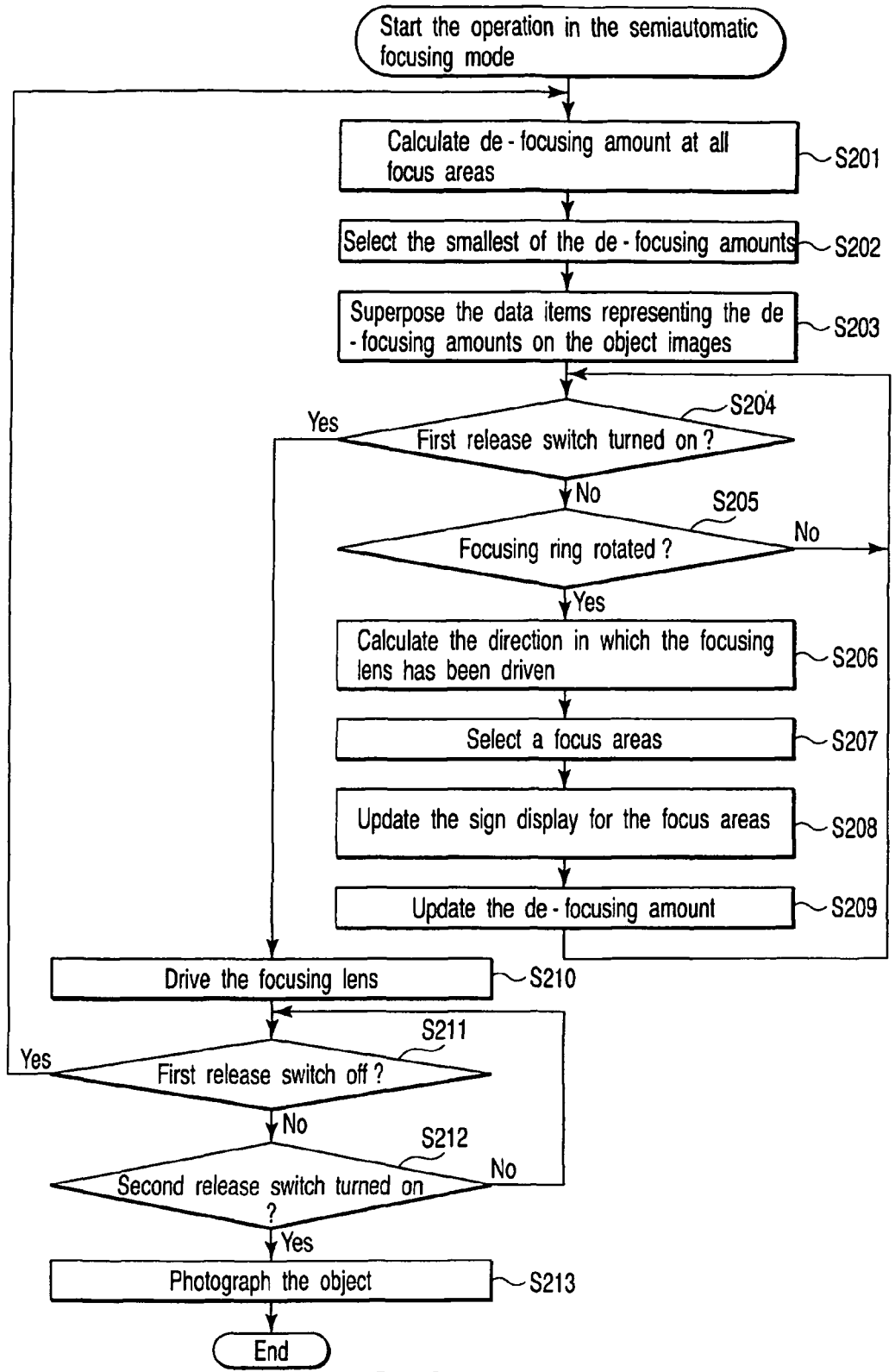
FIG. 10 is a flowchart explaining how the system controller operates while the camera according to a second embodiment remains in the semiautomatic focusing mode.
Figure 11:
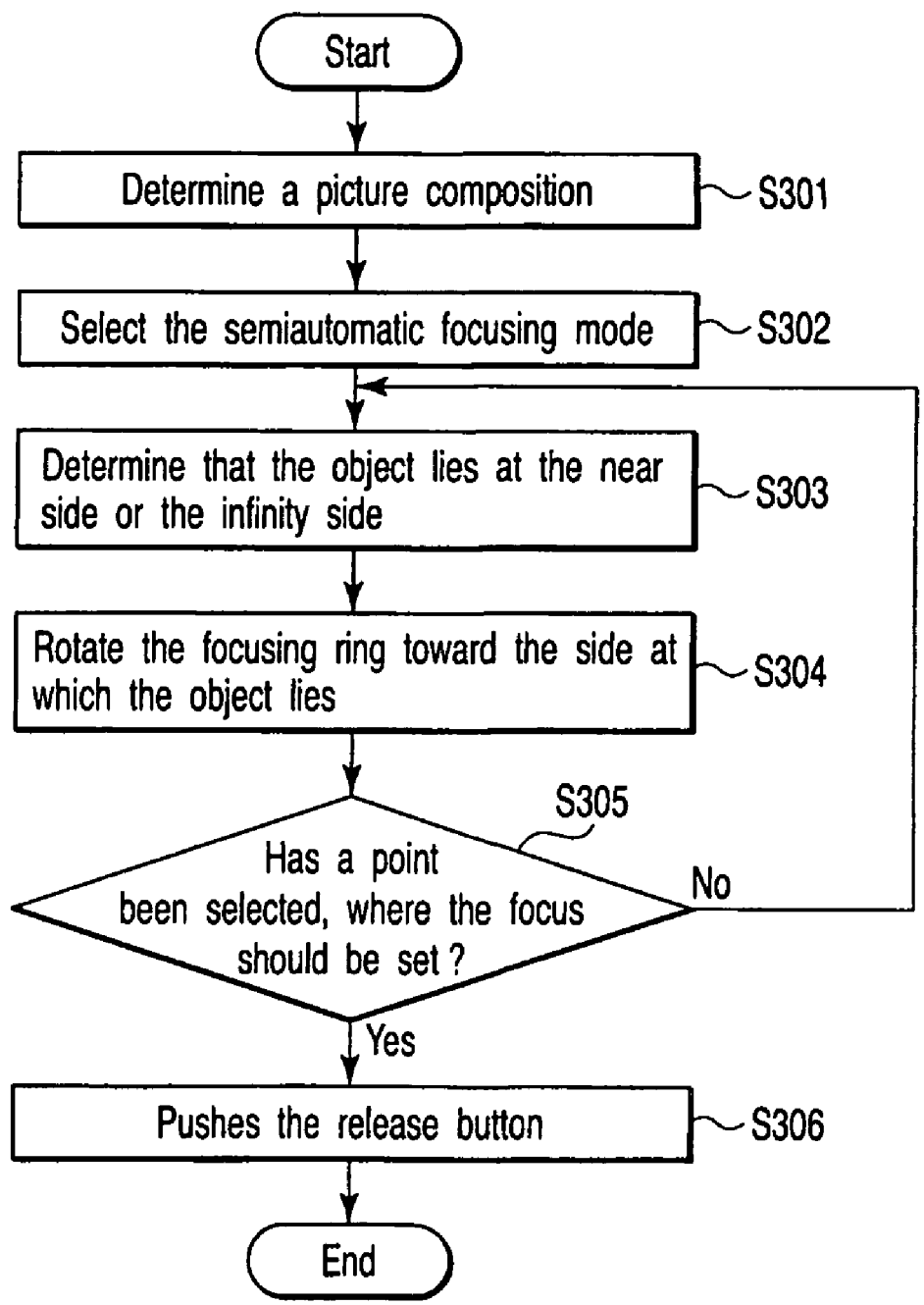
FIG. 11 is a flowchart showing the sequence of steps the user performs to take pictures while the camera according to the second embodiment remains in the semiautomatic focusing mode.

FIG. 10 is a flowchart explaining how the system controller 123 operates while the second embodiment remains in the semiautomatic focusing mode. FIG. 11 is a flowchart showing the sequence of steps the user performs to take pictures while the second embodiment remains in the semiautomatic focusing mode.

First, the process the system controller 123 performs will be explained. When the user selects the semiautomatic focusing mode, the system controller 123 controls the AF controller 122, causing the same to find the distance between two images for each focus area. From the inter-image pitch, the system controller 123 calculates a de-focusing amount at each focus area (Step S201). Thereafter, the system controller 123 selects the smallest of the de-focusing amounts calculated. The system 123 then stores the de-focusing amount selected, in the memory 123a (Step S202).

Next, the system controller 123 makes the image-superposing unit 115 superpose the data items representing the de-focusing amounts for the respective focus areas (focus areas), on the object image projected to the focusing screen 112 (Step S203). The system controller 123 then determines whether the user has pushed the release button 204, turning on the first release switch (Step S204). In Step S204, the first release switch may not be found to have been turned on. If this is the case, the system controller 123 determines whether the user has rotated the focusing ring 201 (Step S205). If the focusing ring 201 is not found to be rotated, in Step S205, the operation returns to Step S204. In this case, the system controller 123 does nothing until the user pushes the first release switch or rotates the focusing ring 201.

Figure 12:
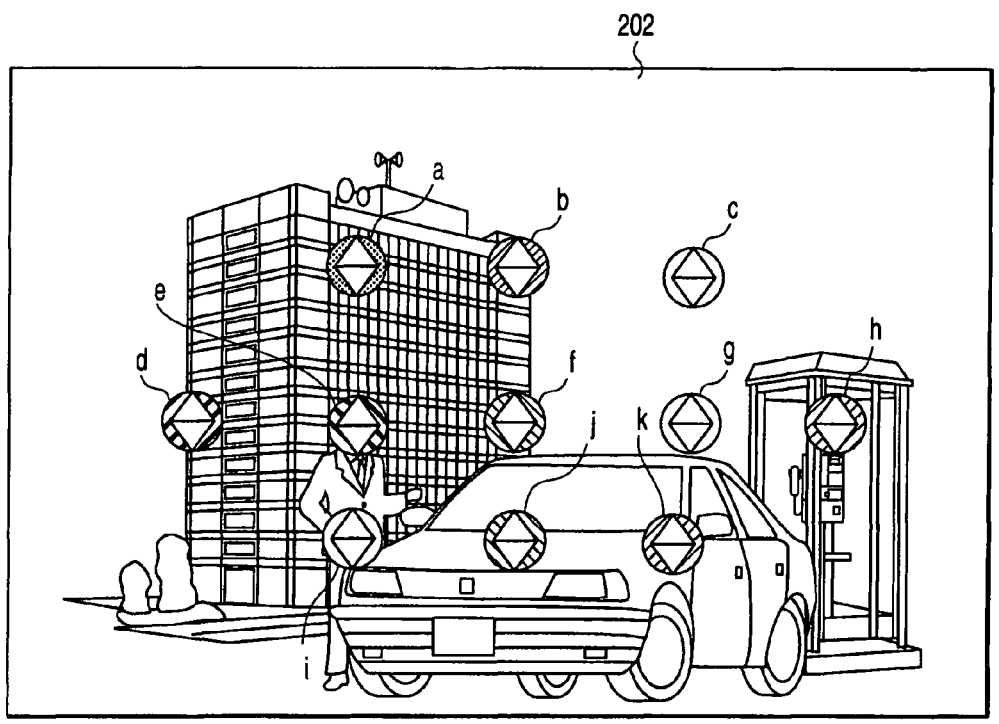
FIG. 12 is a diagram showing a viewfinder image which is displayed on the camera according to the second embodiment and in which the images of several objects are superposed.

FIG. 12 is a diagram showing an example of an image superposed in the viewfinder 202 in Step S203. In the image shown in FIG. 12, the focus is set at focus area e (that is, at the person).

The superposition display in this embodiment is always achieved while the camera remains in the semiautomatic focusing mode. A sign is displayed at a selected focus area for which the focus must be adjusted, indicating that the image is well-focused at the selected focus area. (Note that the focus area selected first is a point for which the smallest de-focusing amount has been calculated in Step S201.) Further, signs are displayed at the other focus areas, visually indicating the order in which the other focus areas should be selected, in place of the selected focus area.

In the image of FIG. 12, the signs at the other focus areas are displayed in different colors, in the ascending order of de-focusing amount, with respect to focus area e selected at present. Instead, the sign at any other focus area may be displayed in a different color, in accordance with whether the focus area is closer to the near side or infinity side than focus area e. Alternatively, the signs displayed at the focus areas may differ in color density. Note that FIG. 12 shows no more than an example of sign displaying. The sign display can be altered, if necessary.

If it is determined in Step S205 that the focusing ring 201 has been rotated, the encoder 107 detects the direction and rotated amount in and for which the focusing ring 201 has been rotated. The encoder 107 outputs a signal that represents the direction and the rotated amount, to the lens CPU 105. The lens CPU 105 monitors the signal supplied from the encoder 107, at regular time intervals. The lens CPU 105 determines the rotated amount for which the ring is rotated per unit time, from the difference between the rotated amount represented by a signal and the rotated amount represented by the next signal. The lens CPU 105 determines the direction in which the ring is rotated from the sign (+ or −) of the difference between the rotated amounts represented by the two consecutive signals. After determining the direction and rotated amount in and for which the ring 201 has been rotated, the lens CPU 105 supplies a signal representing the direction and rotated amount, to the system controller 123, if the rotated amount determined exceeds a preset threshold amount (a parameter set in the lens CPU 105). Upon receipt of this signal, the system controller 123 detects that the focusing ring 201 has been rotated and calculates, from the signal, the direction and rotated amount in and for which the focusing lens 102 has been driven (Step S206).

Next, the system controller 123 selects the smallest of the de-focusing amounts calculated in respect of the same direction as the focusing lens 102 has been driven (Step S207). In Step S207, too, a threshold for the de-focusing amounts may be set in the same way as in the first embodiment. Any de-focusing amount that is smaller than the threshold may be regarded as not sufficiently large enough to drive the lens to attain a focused state.

After selecting the smallest de-focusing amount in Step S207, the system controller 123 updates the sign display for the focus areas (Step S208). The system controller 123 then updates the data representing the smallest de-focusing amount and stored in the memory 123a (Step S209).

The focusing ring 201 may be rotated to the infinity side in the focused state shown in FIG. 12. In this case, the signs of focus areas e, h, f, d, a and b are displayed one after another, in the order they are mentioned. Then, the signs of the focus areas other than the selected one are changed, with the selected focus area used as reference. If the focusing ring 201 is rotated to the near side, the signs of focus areas e, k and j are sequentially displayed in the order they are mentioned. In this case, too, the signs of the focus areas other than the selected one are changed, with the selected focus area used as reference. The objects at focus areas c and g have so low a contrast that de-focusing amounts cannot be detected for them. Focus area i is exempted from selection, because it has almost the same de-focusing amount as focus area e.

In Step S204 it may be determined that the user has turned on the first release switch. If this is the case, the system controller 123 supplies to the lens CPU 105 a signal representing the de-focusing amount stored the memory 123a. In accordance with this de-focusing amount, the lens CPU 105 controls the lens-driving unit 104, causing the lens-driving unit 104 to drive the focusing lens 102 (Step S210). Thereafter, the system controller 123 determines whether the first release switch remains on (Step S211). If the first release switch is turned off, the operation will return to Step S201. Accordingly, the sequence of steps, described above, will be repeated. If the first release switch is found to still be on, in Step S211, the system controller 123 determines whether the user has turned on the second release switch (Step S212). If the second release switch is not found to be on, in Step S212, the operation returns to Step S211. In Step S211 it is determined whether the first release switch remains on. In Step S212 the second release switch may be found to be on. In this case, photographing is started. An electric signal representing the image obtained by the photographing is stored in the storage unit 126 (Step S213). Thus, the process shown in FIG. 10 terminates.

The sequence of steps the user performs will be described in detail, with reference to FIG. 11. The user holds the camera shown in FIG. 1 and directs it to the photography object, thus determining a picture composition. At this time, the viewfinder 202 displays the image shown in FIG. 8A (Step S301).

After determining the picture composition, the user operates the focusing-mode selecting member 203, switching the operating mode of the camera to the semiautomatic focusing mode (Step S302). The user may change the operating mode to the semiautomatic focusing mode before he or she determines the picture composition, as in the first embodiment. At the time the camera is set to the semiautomatic focusing mode, calculation is started to obtain a de-focusing amount. As a result, such an image as shown in FIG. 12 is displayed in the viewfinder 202. Looking into the viewfinder 202, the user confirms the positional relation between the object now focused well and the object that should be focused well (Step S303).

The user rotates the focusing ring 201 toward the near side in order to set the focus at any object lying before the object now focused well, and toward the infinity side in order to set the focus at any object lying beyond the object now focused well (Step S304). Then, the user determines whether the desired object has been focused (Step S305). If the object is not focused as desired, the user further rotates the focusing ring 201. If the object is focused as desired, the user pushes the release button 204, first halfway and then fully down (Step S306). When the release button 204 is depressed halfway, the focus is adjusted. When the release button 204 is fully depressed, the photographing is performed.

As has been described, with the second embodiment the user only needs to rotate the focusing ring 201, selecting any desired focus area. This reduces the number of times the focusing lens 102 should be driven. As a result, the user can bring any desired object to focus, both reliably and easily, and the time required for adjusting the focus can be shortened.

Each embodiment described above is a photographing apparatus, i.e., a single-lens reflex camera having a lens unit. This invention is not limited to a camera with a lens unit, nevertheless.

In each embodiment, the lens is driven by an ultrasonic actuator. Instead, the lens could be driven by a DC motor or a stepping motor. Further, the data communication between the photographing optical unit and the lens unit 101 may be achieved by the AF controller 122, not by the system controller 123 as in the embodiments described above.

Moreover, only the system controller 123 may be used, not using the AF controller 122 at all. In the embodiments described above, the focusing-mode selecting switch 127 is operated to select the semiautomatic focusing mode. Instead, the release button 204 may be depressed halfway down to select the semiautomatic focusing mode when the manual focusing mode is selected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus-controlling apparatus for adjusting a focus in an optical system, the apparatus comprising:
   a focus detecting unit which detects de-focusing amounts of the optical system with respect to a plurality of objects that lie in a plurality of focus areas, respectively;
   a storage unit which stores the de-focusing amounts detected for the respective focus areas;
   a focus area switching unit which switches the focus areas, from one to another, in an order based on the de-focusing amounts stored in the storage unit; and
   a drive control unit which moves the optical system to a focus position corresponding to the de-focusing amount at any focus area switched by the focus area switching unit,
   wherein the focus area switching unit compares a threshold amount with the de-focusing amounts stored in storage unit and sets a focus area to which the focus area is to be switched, in accordance with any de-focusing amount that exceeds the threshold amount.

2. The focus-controlling apparatus according to claim 1, wherein the focus area switching unit uses, as the switched focus area, one of the focus areas corresponding to the de-focusing amounts exceeding the threshold amount, which is least de-focused from the present focus position in the optical system.

3. The focus-controlling apparatus according to claim 1, further comprising a threshold-amount generating unit which generates the threshold amount from a preset amount.

4. The focus-controlling apparatus according to claim 3, wherein the threshold-amount generating unit includes a setting unit which sets the preset amount.

5. The focus-controlling apparatus according to claim 3, wherein the threshold-amount generating unit generates, as the preset amount, a magnification of the optical system.

6. The focus-controlling apparatus according to claim 3, wherein the focus area switching unit includes:
   an operation member which is able to move; and
   an operation detector which detects a moving amount and a moving direction for and in which the operation member has been moved,
   wherein the threshold-amount generating unit generates the threshold amount by using the preset amount as the moving amount that the operation detector detects per unit time.

7. A focus-controlling method adjusting a focus in an optical system, the method comprising:
   (a) detecting de-focusing amounts of the optical system with respect to a plurality of objects that lie in a plurality of focus areas, respectively;
   (b) storing the de-focusing amounts detected for the respective focus areas in a storage unit;
   (c) switching the focus areas, from one to another, in an order based on the de-focusing amounts stored in the storage unit; and
   (d) moving the optical system to a focus position corresponding to the de-focusing amount at any focus area switched by the step (c),
   wherein the step (c) compares, using a controller, a threshold amount with the de-focusing amounts stored in storage unit and sets a focus area to which the focus area is to be switched, in accordance with any de-focusing amount that exceeds the threshold amount.

8. The focus-controlling method according to claim 7, wherein the step (c) uses, as the switched focus area, one of the focus areas corresponding to the de-focusing amounts exceeding the threshold amount, which is least de-focused from the present focus position in the optical system.

9. The focus-controlling method according to claim 7, further comprising
   (e) generating the threshold amount from a preset amount.

10. The focus-controlling method according to claim 9, wherein the step (e) includes
    (f) setting the preset amount.

11. The focus-controlling method according to claim 9, wherein the step (e) generates, as the preset amount, a magnification of the optical system.

12. The focus-controlling method according to claim 9, wherein the step (c) includes:
    (g) detecting a moving amount of a movable operation member and a moving direction for and in which the operation member has been moved,
    wherein the step (e) generates the threshold amount by using the preset amount as the moving amount that the step (g) detects per unit time.

* * * * *